Nov. 27, 1928.

J. N. QUINN 1,693,181

BOILER TUBE BLOWING DEVICE

Filed Aug. 1, 1924 2 Sheets-Sheet 1

Inventor
John N. Quinn
by
Attorneys

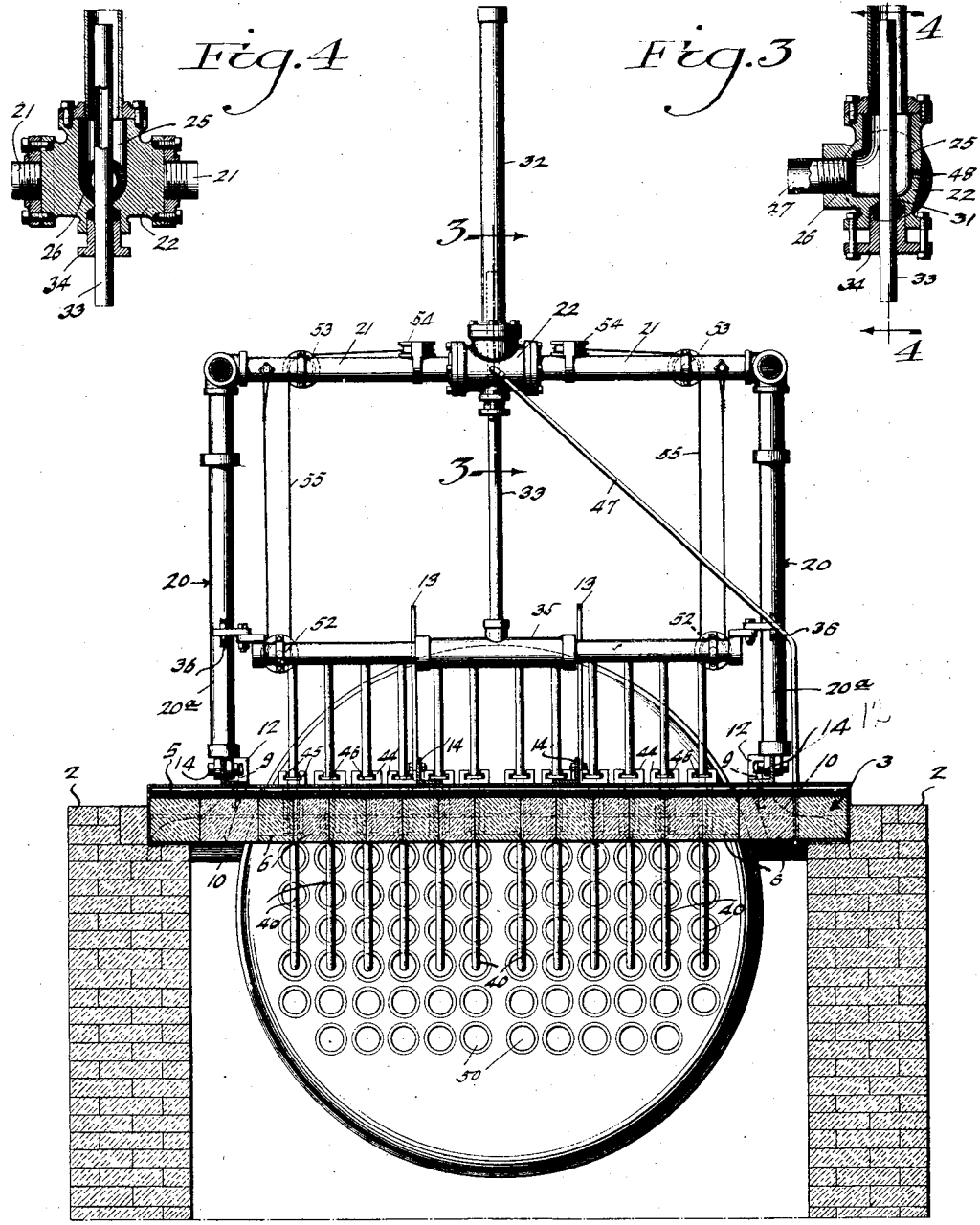

Patented Nov. 27, 1928.

1,693,181

UNITED STATES PATENT OFFICE.

JOHN N. QUINN, OF CINCINNATI, OHIO; RICHARD W. QUINN ADMINISTRATOR OF SAID JOHN N. QUINN, DECEASED.

BOILER-TUBE-BLOWING DEVICE.

Application filed August 1, 1924. Serial No. 729,635.

This invention relates to improvement in boiler flue blowing or cleaning devices and has among its objects the provision of a device adapted to simultaneously blow or clean rows of flues by injecting therethrough, a suitable fluid such as steam, preferably under boiler pressure, and in the direction of the draft of the furnace through the boiler tubes.

Another object of the invention is the provision of means for adjusting the device in operative juxtaposition to the flues to be blown, including means for manually raising and lowering the device.

Another object of the invention is to provide a structure by which steam can be delivered to the blowers through a rigid pipe connection, thus eliminating the use of flexible connections which are ordinarily used for this purpose and, thereby eliminating necessity for frequent renewal of the supply pipe.

Another object of the invention is the provision of a device which can be mounted as a unit at the rear end of the boiler, upon the arch, without necessitating the removal of the arch, the blower tubes of the device being projected through the arch, and the device being further designed to permit the ends of the blower tubes to be raised to a point within the arch, when not in use, to protect the same from the heat within the chamber below the arch. To this end a novel means is provided in the shape of guides or sleeves which traverse the arch and in which the blower tubes are slidable, additional means being provided for sealing the bores of the sleeves about the blower tubes.

Another object of the invention is to provide a cleaning device which may be attached and permanently supported upon the arch, means being provided thereon for guiding the manifold to which the blower tubes are attached and with which they are in communication.

Another object of the invention is to provide novel means whereby a rigid supply line may be used, wherein provision is made for drainage of water of condensation from the supply chamber, a trap being formed which collects and disposes of the water and prevents the same from entering the blower tubes.

Another object of the invention is the provision of hoisting means for raising and lowering the tubes and manifold whereby the operation may be performed with a minimum of power application.

Another object of the invention is to provide a device in the nature of a distributing chamber and trap adapted to receive and distribute steam and to trap any water of condensation to prevent such water being delivered from chamber, said device having a chamber, an inlet leading to the said chamber and a drain opening at the bottom of the chamber, and having a tubular conduit of less diameter than the chamber, slidable therein, in such manner as to maintain constant delivery connection between the chamber and the conduit in any adjusted position of the conduit, but so that the intake end of the tubular conduit is never below the intake opening leading to the chamber, whereby any water of condensation is prevented from entering the conduit and is drained from the chamber by gravity.

Other objects and certain advantages will be more fully set forth in the description of the accompanying drawings forming a part of this specification, in which:

Figure 2 is a vertical transverse section through the arch and a portion of the attachment, on line 2—2, of Fig. 1.

Figure 3 is a vertical section through a coupling member and tubular intake plunger and trap-forming element on line 3—3, of Fig. 2.

Figure 4 is a section on line 4—4, of Fig. 3.

Figure 1:
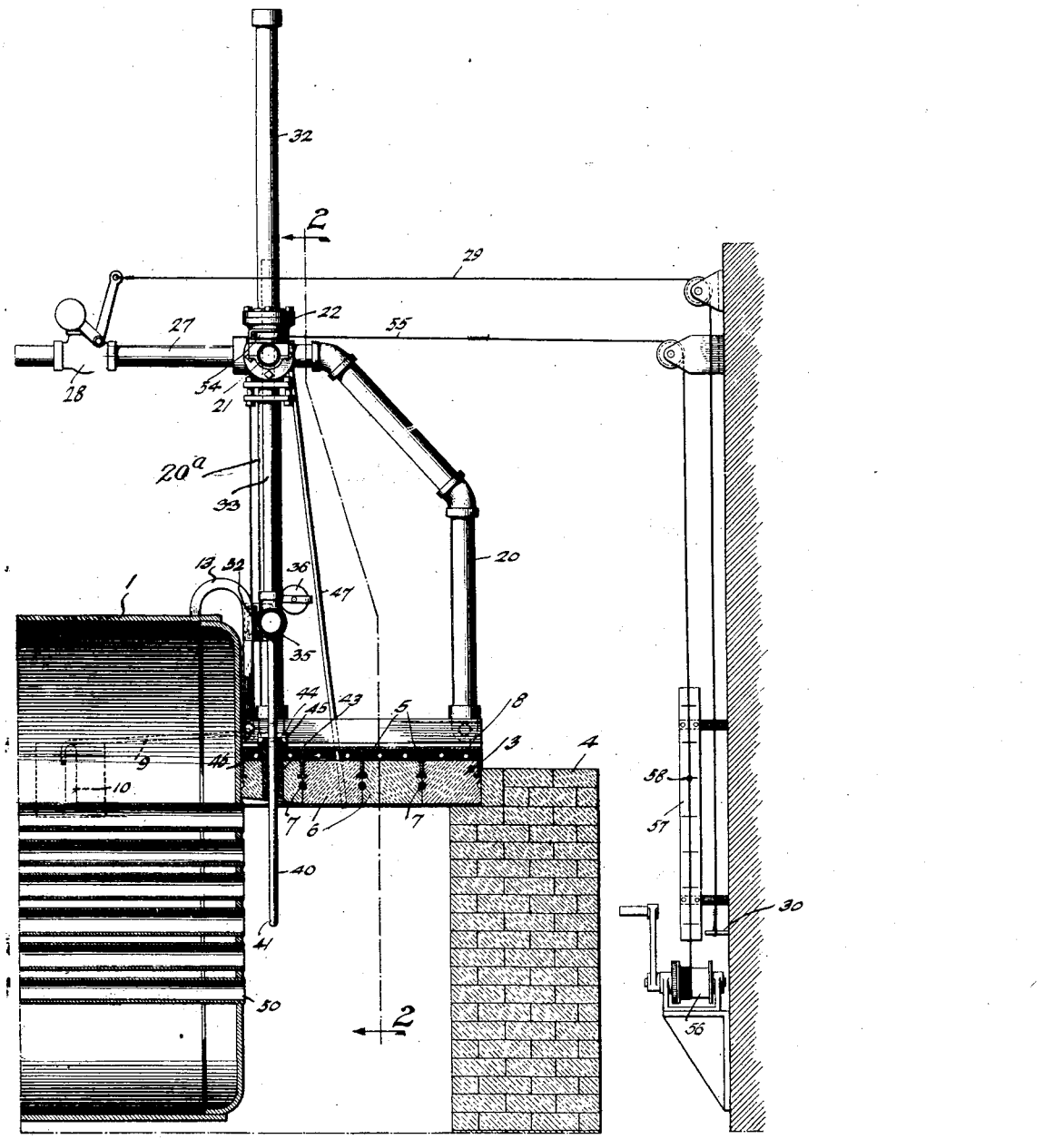
Figure 1 is a longitudinal section through the rear end of a boiler, casing wall, and arch, illustrating one application of my invention.

Referring to Fig. 1, the numeral 1 designates the ordinary form of horizontal fire tube boiler shown in section, which boiler may be of any preferred construction. The boiler is supported by the usual side walls 2 and is mounted over a fire-box, not shown, in the usual manner. The arch is shown at 3, abuts the rear end of the boiler, and rests at its outer end upon a wall 4, as shown. The arch comprises spaced eyebeams 3 transversely disposed with reference to the long axis of the boiler. The opposite ends of the beams are suitably supported by the walls 2, and locked in suspended position between the eyebeams and extending below the same are fire bricks 6. Below and adjacent the eyebeams are additional reinforcing rods 7 extending transversely of the arch, and between the bricks. Over the top of the eyebeams and resting thereon is a sheet metal plate cap 8 which is turned downwardly at each end of the arch and the ends interposed between the ends of the arch and the walls, as shown in Fig. 2. The arch is held against the boiler by means of suitable tie-rods 9 engaged with the boiler supporting brackets 10, these rods being threaded at one end, and being passed through and locked to anchor brackets 12 attached to the plate 8. The arch is also supported on hangers 13, as shown, which rest on the boiler at one of their ends and at their other end are bolted to angle irons 14 attached to the plate 8.

The cleaning or blowing-device, as a unit, is adapted to be attached at the upper side of the arch to angle irons 14, these angle irons extending longitudinally of the arch and being located in spaced relation at opposite sides of the boiler, the width between the irons being approximately equal to the diameter of the boiler. The supporting structure for the blowing tubes and manifold as well as for the hoisting devices associated therewith is composed of two side frames 20, each composed in this instance of sections of piping, each frame providing two legs or feet having spaced lugs thereon adapted to straddle the vertical flanges of the irons 14, the lugs having openings therethrough for fastening devices in the form of bolts, for holding the legs and frames against displacement. The frames are held together at that side adjacent the boiler by a cross arm or member, comprising in this instance two pipe sections 21, in threaded connection with the side frames, and with a coupling member 22 located centrally of the cross bar or support. This coupling member is in the nature of a distributing valve or chamber, and trap, and herein has the general form of a T-coupling; but has passages therein specially arranged and differing from the standard T. The coupling is provided with a centrally, vertically disposed chamber or passage 25, and has a second passage 26 communicating therewith in this instance, the intake passage, to which is connected the steam supply pipe 27, provided with a gravity closable valve 28, of any preferable structure. This valve is adapted to be manually opened in this instance by means of a cord or wire 29, passing over a pulley, and having at its lower end a loop engageable with a pin 30, preferably in a manner for holding the valve open during the blowing operation. The passage 25 of the chamber is elongated or extended by a tube or pipe 32, closed at its upper end, and this pipe is suitably connected to the coupling in communication with the passage as best shown in Figs. 3 and 4. This connection is similar to that used for the pipes 21, and comprises a flange bolted to the coupling member 22, said flange having threaded connection with the extension 32. The passage 25 extends through the coupling member, is slightly reduced in diameter adjacent its lower end, as at 31, and a tubular element 33 of less diameter than the passage 25 and tubular extension is introduced therein, and a packing gland 34 provided for sealing against leakage at this point. The tubular element is slidable within the gland and is adapted to receive a supply of steam at its upper end and deliver the same into the manifold 35, attached at its lower end. This manifold extends crosswise between the inner members 20ª of the side frames and is slidably engaged at opposite ends with the frames by guide rollers 36. The tubular element is located centrally of the manifold and in this instance the manifold is composed of a central T-section and two pipe sections engaged with opposite sides of the T-section, these pipe sections being closed at the outer ends by suitable caps to which are attached the guide rollers. Depending from the manifold are a series of tubular closed end blower elements 40 in communication with the manifold and in this instance each has an opening 41 adjacent the lower closed end. These openings face in the direction of the flues. As herein shown, one series of openings only are employed and they are arranged in a horizontal row, and the tubes may be raised or lowered to juxtapose the same to the other rows of flue openings. The blower tubes extend loosely through sleeves 43 traversing the arch, sufficient play only being provided to prevent undue friction. The sleeves each are provided with a head 44 at the upper end which is grooved, as shown at 45, for the reception of cap plates 46 of suitable material which slidably engage the tubes and close the bores of the sleeves. The overhanging flanges formed by grooving, of the head, prevent upward displacement of the cap plates when the blower tubes are raised.

The length of the tubular element 33 is such that with the openings 41 of the tubes 40 in opposition to the lowermost row 50 of tubes of the boiler, the upper end of the element will be above the level of the intake pipe 27 so that any water of condensation will be caught in a trap formed by the element 33 and passage or chamber 25, and will be blown through the drain pipe 47 which is connected with the threaded opening 48 in the side of the coupling and extends through the arch, as shown.

The arrangement of the tubular manifold element within the coupling member provides means whereby the manifold can be raised and lowered, and connection maintained between the steam supply and manifold at all times, thus eliminating the use of flexible tubing connection between the steam supply and the manifold.

In order to raise and lower the manifold in a proper degree and with a minimum of applied power the blower unit is further equipped with a hoisting apparatus comprising two spaced pulleys 52 attached at opposite ends of the manifold, two corresponding spaced pulleys 53 attached to the upper cross or supporting bar 21 and two additional pulleys 54 attached in horizontal position to the bar adjacent the coupling member.

Two systems of pulleys are thus provided symmetrically arranged with regard to the axis of the apparatus. Each system has associated therewith a rope or wire 55 which is attached at one end to the cross bar, engages around a pulley 52 of the manifold, thence around the adjacent pulley 53 of the cross bar, around the adjacent pulley 54 and in this case then extends rearwardly to a certain point wherewith the ends of the respective wires are attached together and thence a single wire is engaged over a wall pulley, and the end suitably attached to a winding drum 56 in this instance mounted on a wall bracket. In order to register the openings of the blower tubes with the boiler tubes in proper relation for a blowing operation, a scale 57 is provided having graduations thereon, each corresponding to the position of the blower tube openings relative to corresponding row of boiler tubes. A small marker 58 is attached to the wire and may be registered with the graduations for obtaining the above results.

In operation, the tubes 40 as a unit with the manifold 35 are lowered preferably to bring the nozzle ends of the tubes in line with the lowermost row of tubes of the boiler. Thereupon the valve 28 is opened by pulling the wire 29 for injecting steam through such row of boiler tubes. After they have been properly cleansed the blower tubes 40 are raised to bring their nozzles in line with the next row of boiler tubes and the blowing operation continued, and so on until all of the rows of tubes have been cleaned. The blower tubes therefore are adjusted to bring their nozzle in line with any selected row of the boiler tubes and are sustained in such position for any period required. After the blowing operation is completed the blower tubes are elevated to a height to bring their nozzle ends within the sleeves 43 in the furnace arch protecting them from the heat of the furnace when not in use.

The entire flue blowout apparatus is supported upon the flat arch and the arch itself comprises a unit which can be bodily raised from the furnace wall if at any time for repair access is to be had into the interior of the rear end of the furnace.

Having described my invention, what I claim is:

1. In a device of the class described, a main frame structure including a vertically disposed conduit closed at its upper end and having a stuffing box at its opposite end, a movable conduit extending through said stuffing box and telescopically into said conduit, a manifold connected with said movable conduit slidable on said frame, and a plurality of tubes depending from said manifold and relatively parallel, each tube having a nozzle opening at its lower end.

2. In a device of the class described, spaced frames adapted for attachment to a support, a cross member connecting said frames and comprising a central coupling member having an elongated passage therein closed at one end, and having a second passage communicating with the first mentioned passage, a tubular element hermetically closing the elongated passage at the opposite end, translatable in said passage and communicating therewith, a manifold slidable upon the frame attached to and communicating with the tubular element, and tubes each having a closed end and attached to and communicating with said manifold arranged in parallel relation each having an opening therein and said openings aligned.

3. In a device of the class described, in combination with a boiler having rows of tubes, a frame mounted upon said boiler, said frame comprising spaced side sections, a cross member uniting said side sections, comprising a central coupling member having an elongated passage therein, closed at one end, and having a second passage communicating with the first mentioned passage, and a drain passage leading from the bottom of said elongated passage, a fluid supply pipe connected with said second passage, a tubular element hermetically closing the elongated passage at the opposite end, translatable in said passage, and of less diameter than the passage, a manifold attached to and communicating with said tubular element, tubes each having a closed end attached to and communicating with said manifold extending therefrom in parallel relation each having an opening adjacent its closed end, said openings aligned, said tubular element being of such length that its upper end extends above the second passage of said coupling member, when the row of openings is in opposition to the lowermost row of boiler tubes.

4. In a device of the class described, in combination with a boiler having rows of tubes, a frame detachably mounted upon said boiler, a coupling member attached to said frame, having an elongated passage therein closed at one end and having an intake passage communicating with the first mentioned passage, and a drain passage leading from said elongated passage, a tubular element hermetically closing the elongated passage at the opposite end, translatable in said passage and of less diameter than the passage, a manifold attached to and communicating with said tubular element, tubes each having a closed end and attached to and communicating with said manifold extending therefrom in parallel relation each having an opening adjacent its closed end, said openings aligned, said tubular element being of such length that its upper end extends above the second passage of said coupling member when the row of openings is in opposition to the lowermost row of boiler tubes.

5. The combination of a boiler and furnace, the furnace provided with a horizontal arch wall, a frame supported upon said wall, a plurality of tubes in parallel arrangement extending through openings in the arch wall and each tube provided with a lateral nozzle opening at its lower end, a manifold for connecting said tubes as a unit, slidably mounted upon said frame, a conduit composed of telescopically related elements fixed to said frame and connecting with said manifold for providing an extensible fluid conveying connection for said manifold and means for supplying steam to said telescopic conduit.

In witness whereof, I hereunto subscribe my name.

JOHN N. QUINN.